March 27, 1951
O. R. JONES
2,546,264
CORNHUSKING MACHINE
Filed June 26, 1947
2 Sheets-Sheet 1
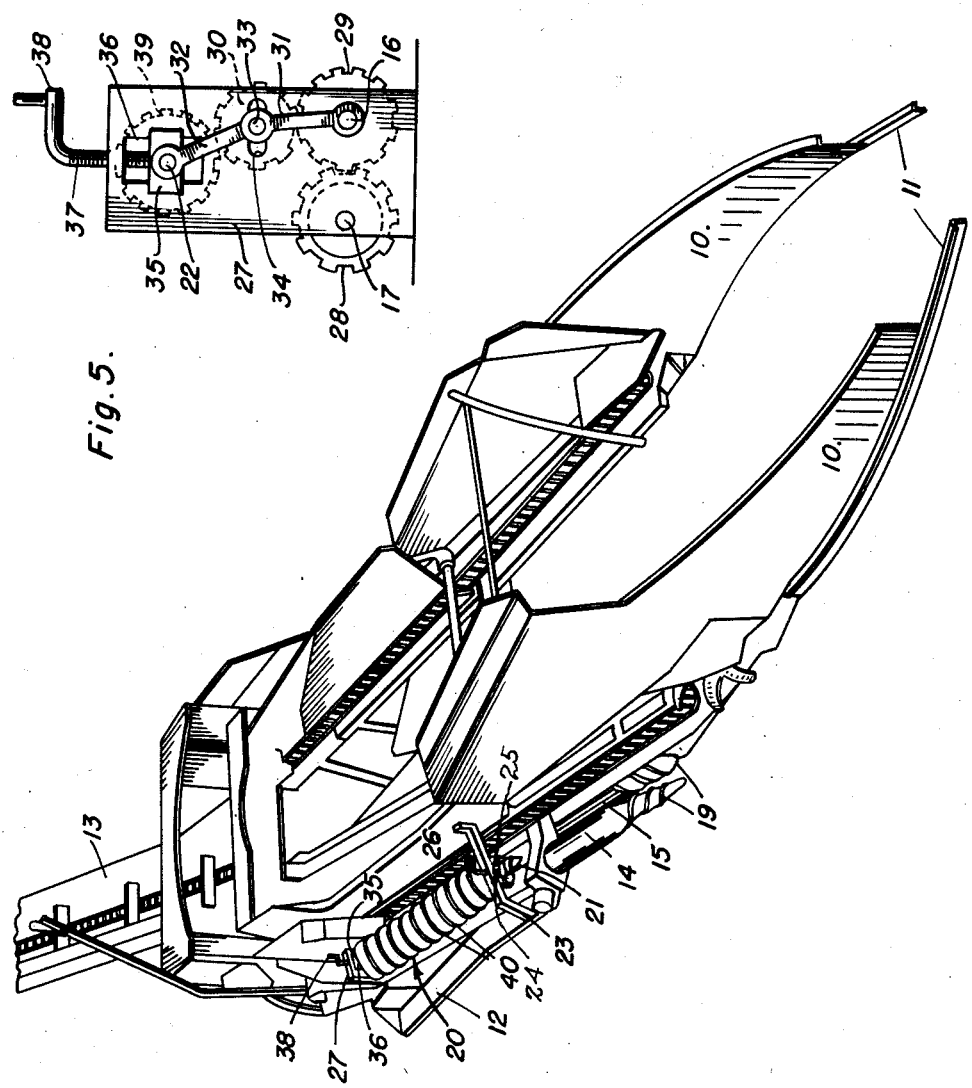
Inventor
Owen R. Jones
By Clarence A. O'Brien
and Harvey B. Jackson
Attorneys

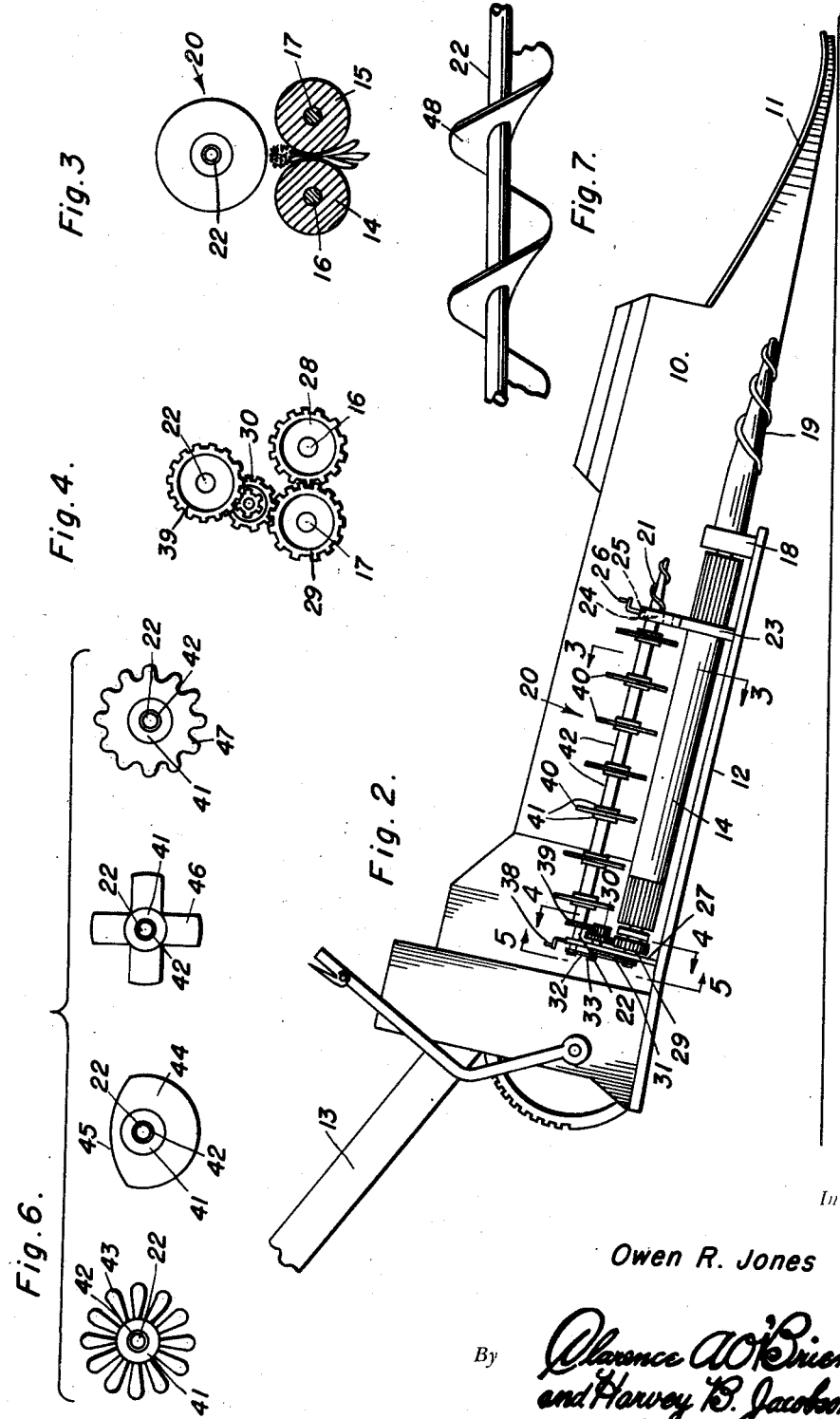
March 27, 1951 — O. R. JONES — 2,546,264
CORNHUSKING MACHINE
Filed June 26, 1947 — 2 Sheets-Sheet 2
Inventor
Owen R. Jones
By Clarence A. O'Brien
and Harvey B. Jacobson
Attorneys Patented Mar. 27, 1951

2,546,264

UNITED STATES PATENT OFFICE 2,546,264

CORNHUSKING MACHINE

Owen R. Jones, Frankfort, Kans.

Application June 26, 1947, Serial No. 757,269

1 Claim. (Cl. 130—5)

This invention relates to an improved corn husking machine, and more particularly to the rollers thereof constituting means for automatically stripping the ears of the husk thereon and accommodating ears of different sizes.

Another object of the invention is to provide a third roll or roller to a corn picker or husker having two rollers or rolls arranged in pairs in the shucking boxes thereof, the third roller being designed to revolve the ears of corn so that they will be completely and entirely husked. Usually, with two rolls, the ear is carried up over them with only a tin flap or other retarder above them and many times, the ear travels through getting husked only on one side. The third roller is designed to turn the ear as it travels over these rollers to insure complete husking.

Another object of the invention is to construct the third roller in different forms and to permit adjustment thereof for ears of different sizes and insure proper husking thereof.

Corn husking machines are made in different types, in which the husking rolls are independent of the snapping rolls, or disposed in line therewith and at their forward ends and may be combined with stripping means for stripping the ears from the stalks. The stripping means may be chain carried to also advance the ears, or may be operated by gravity along the husking rollers independently of the snapping rolls with retarders, but such retarders do not turn the ear as it is held down on the husking rolls. The present invention embodies an upper or third roller of a soft or flexible nature which can be adjusted vertically to accommodate ears of different sizes, and which turns the ear as it retards the movement along the husking rollers, so that instead of husking the ears on one side only, the ears will be completely husked.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of part of a corn husking machine of one type employing chains, and with the invention applied thereto.

Figure 2 is a side elevation showing the corn husking machine with the snapping rolls in line with and in front of the husking rolls, and with the improved third roller together with the adjusting means applied thereto.

Figure 3 is a sectional view taken on the line 3—3 of Figure 2.

Figure 4 is a detail view of the drive means taken on the line 4—4 of Figure 2.

Figure 5 is an elevation taken on the line 5—5 of Figure 2 with the parts enlarged.

Figure 6 is a detail view showing different forms of third roller, and

Figure 7 is a fragmentary detail view of another or spiral form of auger type of third roller.

Referring to the drawings in detail, in which like reference characters designate corresponding parts throughout the several views, there is shown in Figures 1 and 2, a type of corn husking machine including a snapping and husking unit having shields 10 with fingers 11 and comprising a frame 12 and an elevator 13 leading up from the rear thereof. At one side or at both sides, husking rollers or rolls 14 and 15 are mounted of the usual or any preferred type upon shafts 16 and 17 journaled in suitable bearings 18 at their forward ends, and in this instance, provided at their forward ends and in line therewith, with snapping rolls 19 illustrated as of the spiral screw or auger type tapered toward their forward ends. However, it is understood that the invention is not limited to this type and may be applied to other types as above referred to.

The present improvement consists primarily in providing an upper or third roller or roll 20 above and between the husking rolls 14 and 15, which may be provided with a spiral snapping roll 21 at the forward end thereof if desired. However, primarily, the upper roll 20 is mounted upon a shaft 22 with its forward end journaled in a bearing 23 so as to be capable of vertical adjustment. The bearing 23 is supported upon the frame 12 and the bearing proper 24 thereof is mounted to move up and down in a slot 25 capable of vertical adjustment by a suitable screw having a crank handle 26 similar to that shown in Figure 5 of the drawings.

At the rear end the third roll 20, which is designed to turn and retard the corn ears as fed along the husking rollers, is journaled in a bearing or bracket 27 supported upon the frame 12, and suitable means are provided for driving the husking rollers such as belt, chain or gear drives. In this instance, the shafts 16 and 17 have mounted upon their rear ends, pinions or gears 28 and 29, disposed in mesh, so as to revolve in opposite directions as indicated by the arrows in Figure 5 so as to move downwardly at their inner sides. An idler gear or pinion 30 is disposed in mesh with the gear or pinion 29 and is mounted upon a pair of pivoted links 31 and 32, the former being pivoted at the axis or shaft 16 of the husking roll 14 and pivotally connected as at 33 to the link 32 in a horizontal slot 34, so as to move back and forth and travel partially around the pinion or gear 29. The upper end of the link 32 is connected to a sliding bearing 35 which moves up and down in a slot 36 capable of adjustment by a screw 37 having a crank handle 38 so that the third or upper roll 20 constituting a retarder and means for turning the ears of corn while they are being husked by the husking rolls 14 and 15, may be adjusted up and down with respect to the rolls 14 and 15, to vary the spacing therebetween to accommodate different sizes of ears. However, it will be noted that the pinion 30 will remain in engagement with a pinion or gear 39 fixed to the shaft 22 of the roll 20 and may be moved up and down, while the pinion 30 revolves to either side, on the pinion 29 so as to positively drive the third roll 20 at all times, while varying the spacing therebetween. The bearing at the bracket 23 is also adjusted so as to maintain proper relation between both ends of the third or upper roller 20 and the husking rolls.

As shown, the third roller may comprise a series of flexible, soft or rubber disks 40 properly spaced apart along the shaft 22 and held on opposite sides by washers 41, with spacers 42 therebetween, so as to revolve in the direction indicated by the arrows. In this way, the movement of the ears along the husking rollers is retarded, but they are caused to revolve or turn so that the entire surface thereof is presented to the husking rollers to completely husk the same, instead of husking the ears of corn on one side only, as indicated in Figure 3 of the drawings. In this view, the direction of revolving or turning the ears of corn is indicated, the ears being designated at C.

In Figure 6 of the drawings, the third roller may have a plurality of flexible fingers 43 or take the form of a brush, either as disks or as spiral members with washers or collars retaining the same in position on the shaft 22 as previously described and with suitable spacers therebetween as previously described in connection with the disks 40. There is also shown an eccentric type 44 or a disk having a flat side 45, or a cross shaped flexible member of rubber or the like, as indicated at 46, or a corrugated type as indicated at 47 with the same retaining and spacing means upon the shaft 22.

In Figure 7 of the drawings, the shaft 22 is shown provided with a spiral type of upper roll having a spiral or auger blade 48 mounted on the shaft to regulate the feeding or retarding of the ears and also to turn the same against the husking rolls 14 and 15 for the purpose of turning the ears and moving the same rearwardly at the proper speed to complete the husking thereof entirely around the same. It is, of course, to be understood that the spiral blade of the roll shown in Figure 7 may be of one piece, and made of soft rubber or similar material to cause effective turning of the ears of corn without injury thereto or that more than one spiral might be used on one shaft even in parallel one to the other.

Thus, is will be seen that the device may be applied to various types of husking machines which may include corn pickers or strippers and in which the snapping rolls are in line with or at right angles to the husking rolls and in which the feed is by any suitable means, such as chains, paddles or otherwise, or by gravity feed, and that the device will effectively turn the ears as it travels over the husking rollers so that instead of husking the ears only on one side, the same will be completely husked entirely around the ears. In this way, clean and effective husking of the ears of corn will be accomplished.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what I claim as new is:

In a husking machine, a pair of husking rollers suitably journaled, an upper roller above said husking rollers and between the same, bearings for said upper roller, means for adjusting said bearings vertically, drive means between the husking rollers and the upper roller and adapted to permit movement of the upper roller toward and away from the husking rollers, said upper roller comprising a shaft having flexible disks mounted thereon in fixed spaced relation.

OWEN R. JONES.

REFERENCES CITED

The following references are of record in the file of this patent:

UNITED STATES PATENTS

| Number | Name | Date |
| --- | --- | --- |
| 110,061 | Meader | Dec. 18, 1870 |
| 407,423 | Stickney | July 23, 1889 |
| 566,181 | Irwin | Aug. 18, 1896 |
| 573,500 | Woodman | Dec. 22, 1896 |
| 915,934 | Butler et al. | Mar. 23, 1909 |
| 945,005 | Rosenthal | Dec. 28, 1909 |
| 1,188,084 | Kreitzer | June 20, 1916 |
| 1,771,027 | Bradley et al. | July 22, 1930 |
| 2,239,899 | Nightenhelser et al. | Apr. 29, 1941 |
| 2,416,124 | Siemen | Feb. 18, 1947 |
| 2,442,231 | Churchill | May 25, 1948 |

FOREIGN PATENTS

| Number | Country | Date |
| --- | --- | --- |
| 19,761 | Great Britain | Oct. 21, 1895 |